(12) United States Patent
Mitsunobu et al.

(10) Patent No.: US 11,807,940 B2
(45) Date of Patent: Nov. 7, 2023

(54) PLATED STEEL MATERIAL

(71) Applicant: NIPPON STEEL CORPORATION, Tokyo (JP)

(72) Inventors: Takuya Mitsunobu, Tokyo (JP); Takehiro Takahashi, Tokyo (JP); Jun Maki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/789,753

(22) PCT Filed: Feb. 27, 2020

(86) PCT No.: PCT/JP2020/008148
§ 371 (c)(1),
(2) Date: Jun. 28, 2022

(87) PCT Pub. No.: WO2021/171514
PCT Pub. Date: Sep. 2, 2021

(65) Prior Publication Data
US 2023/0193443 A1 Jun. 22, 2023

(51) Int. Cl.
*C23C 2/06* (2006.01)
*C23C 2/28* (2006.01)
(Continued)

(52) U.S. Cl.
CPC .............. *C23C 2/06* (2013.01); *B21D 22/20* (2013.01); *B32B 15/01* (2013.01); *B32B 15/012* (2013.01);
(Continued)

(58) Field of Classification Search
CPC ......... C23C 30/005; C23C 30/00; C23C 2/06; C23C 2/12; C23C 2/29; C23C 2/28; C23C 2/40; C23C 2/02; C23C 2/26; C22C 18/04; C22C 18/00; C22C 21/08; C22C 21/00; C22C 21/10; C22C 30/00; C22C 30/06; C22C 38/00; C22C 38/06; C22C 38/58; B32B 15/01; B32B 15/012; B32B 15/013; B32B 15/04; B32B 15/043; B32B 15/18; Y10T 428/26; Y10T 428/12757; Y10T 428/12799; Y10T 428/12958; Y10T 428/12972; C21D 1/18; C21D 9/00; B21D 22/20
See application file for complete search history.

(56) References Cited

U.S. PATENT DOCUMENTS

2009/0199934 A1* 8/2009 Liu ........................ C23C 2/26
148/400
2019/0390303 A1 12/2019 Tokuda et al.
2020/0002798 A1 1/2020 Tokuda et al.

FOREIGN PATENT DOCUMENTS

JP 2009-120948 A 6/2009
JP 2012-112010 A 6/2012
(Continued)

*Primary Examiner* — Michael E. La Villa
(74) *Attorney, Agent, or Firm* — Birch, Stewart, Kolasch & Birch, LLP (57) ABSTRACT

A plated steel material comprising a steel base material and an Al—Zn—Mg-based plating layer formed on a surface of the steel base material, wherein the plating layer has a predetermined chemical composition, and in a surface structure of the plating layer, there is, by area ratio, 2.0% or more of an acicular Al—Zn—Si—Ca phase.

8 Claims, 2 Drawing Sheets

(51) Int. Cl.
| | |
|---|---|
| *C23C 2/12* | (2006.01) |
| *C23C 30/00* | (2006.01) |
| *C22C 18/04* | (2006.01) |
| *C22C 21/08* | (2006.01) |
| *B32B 15/01* | (2006.01) |
| *B32B 15/04* | (2006.01) |
| *B32B 15/18* | (2006.01) |
| *C22C 18/00* | (2006.01) |
| *C22C 21/00* | (2006.01) |
| *C22C 21/10* | (2006.01) |
| *C22C 30/00* | (2006.01) |
| *C22C 30/06* | (2006.01) |
| *C23C 2/40* | (2006.01) |
| *C23C 2/02* | (2006.01) |
| *C23C 2/26* | (2006.01) |
| *B21D 22/20* | (2006.01) |
| *C22C 38/58* | (2006.01) |
| *C22C 38/00* | (2006.01) |
| *C22C 38/06* | (2006.01) |
| *C21D 1/18* | (2006.01) |
| *C21D 9/00* | (2006.01) |

(52) U.S. Cl.
CPC ............ *B32B 15/013* (2013.01); *B32B 15/04* (2013.01); *B32B 15/043* (2013.01); *B32B 15/18* (2013.01); *C22C 18/00* (2013.01); *C22C 18/04* (2013.01); *C22C 21/00* (2013.01); *C22C 21/08* (2013.01); *C22C 21/10* (2013.01); *C22C 30/00* (2013.01); *C22C 30/06* (2013.01); *C23C 2/02* (2013.01); *C23C 2/12* (2013.01); *C23C 2/26* (2013.01); *C23C 2/28* (2013.01); *C23C 2/29* (2022.08); *C23C 2/40* (2013.01); *C23C 30/00* (2013.01); *C23C 30/005* (2013.01); C21D 1/18 (2013.01); C21D 9/00 (2013.01); C22C 38/00 (2013.01); C22C 38/06 (2013.01); C22C 38/58 (2013.01); *Y10T 428/12757* (2015.01); *Y10T 428/12799* (2015.01); *Y10T 428/12958* (2015.01); *Y10T 428/12972* (2015.01); *Y10T 428/26* (2015.01)

(56) References Cited

FOREIGN PATENT DOCUMENTS

| | | |
|---|---|---|
| WO | WO 2018/139619 A1 | 8/2018 |
| WO | WO 2018/139620 A1 | 8/2018 |

\* cited by examiner

PLATED STEEL MATERIAL

FIELD

The present invention relates to a plated steel material.

BACKGROUND

As a technique for press-forming a material which is difficult to shape, such as high strength steel sheet, hot stamping (hot pressing) is known. Hot stamping is a hot shaping technique which shapes a material supplied for shaping after heating it. In this technique, the material is shaped after heating, therefore at the time of shaping, the steel material is soft and has good shapeability. Therefore, even a high strength steel material can be precisely formed into a complicated shape. Further, the press die simultaneously performs the shaping and hardening, therefore it is known that after shaping, the steel material has sufficient strength.

PTL 1 describes a plated steel sheet for hot pressing characterized by having an Al—Zn-based alloy plating layer containing Al: 20 to 95 mass %, Ca+Mg: 0.01 to 10 mass %, and Si on the steel sheet surface. Further, PTL 1 describes that such a plated steel sheet can prevent the plating from adhering to the die at the time of hot pressing, since oxides of Ca or Mg are formed on the surface of the Al—Zn-based alloy plating layer.

In relation to an Al—Zn-based alloy plating, PTL 2 describes an alloy plated steel material characterized by containing, by mass %, Al: 2 to 75%, Fe: 2 to 75%, and a balance of 2% or more of Zn and unavoidable impurities in the plating layer. Further, PTL 2 teaches that, from the viewpoint of improvement of the corrosion resistance, it is effective to further include Mg: 0.02 to 10%, Ca: 0.01 to 2%, Si: 0.02 to 3%, etc., in the plating layer.

Further, in relation to an Al—Zn-based alloy plating, PTL 3 describes a plated steel material comprising a steel material and a plating layer arranged on the surface of the steel material and containing a Zn—Al—Mg alloy layer, wherein, in a cross-section of the Zn—Al—Mg alloy layer, an area fraction of the $MgZn_2$ phase is 45 to 75%, a total area fraction of the $MgZn_2$ and Al phases is 70% or more, and an area fraction of Zn—Al—$MgZn_2$ ternary eutectic structure is 0 to 5% and the plating layer contains, by mass %, Zn: more than 44.90% to less than 79.90%, Al: more than 15% to less than 35%, Mg: more than 5% to less than 20%, Ca: 0.1% to less than 3.0%, Si: 0% to 1.0%, etc.

Similarly, PTL 4 describes a plated steel material comprising a steel material and a plating layer arranged on the surface of the steel material and containing a Zn—Al—Mg alloy layer, wherein the Zn—Al—Mg alloy layer has a Zn phase, the Zn phase contains a Mg—Sn intermetallic compound phase, and the plating layer contains, by mass %, Zn: more than 65.0%, Al: more than 5.0% to less than 25%, Mg: more than 3.0% to less than 12.5%, Ca: 0% to 3.00%, Si: 0% to less than 2.5%, etc.

CITATIONS LIST

Patent Literature

[PTL 1] Japanese Unexamined Patent Publication No. 2012-112010
[PTL 2] Japanese Unexamined Patent Publication No. 2009-120948
[PTL 3] WO 2018/139620
[PTL 4] WO 2018/139619

SUMMARY

Technical Problem

If, for example, using a Zn-based plated steel material in hot stamping, the material is worked in a state where the Zn is molten, therefore the molten Zn will sometimes penetrate into the steel and cause cracking inside the steel material. Such a phenomenon is called "liquid metal embrittlement (LME)". It is known that the fatigue characteristics of a steel material fall due to the LME.

On the other hand, if using a plated steel material containing Al as a constituent of the plating layer in hot stamping, it is known that, for example, the hydrogen generated at the time of heating in the hot stamping will sometimes penetrate the steel material and cause hydrogen embrittlement cracking.

However, in conventional Al—Zn-based plated steel materials used in hot stamping, there has not necessarily been sufficient study from the viewpoint of suppressing LME and hydrogen embrittlement cracking.

Therefore, an object of the present invention is to provide a plated steel material improved in LME resistance and hydrogen penetration resistance and, further, excellent in corrosion resistance after hot stamping.

Solution to Problem

The present invention to achieve the above object is as follows:

(1) A plated steel material comprising a steel base material and a plating layer formed on a surface of the steel base material, wherein the plating layer has a chemical composition comprising, by mass %, Al: 25.00 to 75.00%,
Mg: 7.00 to 20.00%,
Si: 0.10 to 5.00%,
Ca: 0.05 to 5.00%,
Sb: 0 to 0.50%,
Pb: 0 to 0.50%,
Cu: 0 to 1.00%,
Sn: 0 to 1.00%,
Ti: 0 to 1.00%,
Sr: 0 to 0.50%,
Cr: 0 to 1.00%,
Ni: 0 to 1.00%,
Mn: 0 to 1.00%, and
balance: Zn and impurities, and
in a surface structure of the plating layer, there is, by area ratio, 2.0% or more of an acicular Al—Zn—Si—Ca phase.

(2) The plated steel material according to the above (1), wherein the surface structure of the plating layer comprises, by area ratio,
an acicular Al—Zn—Si—Ca phase: 2.0 to 20.0%,
an α phase: 5.0 to 80.0%,
an α/τ eutectic phase: 20.0 to 90.0%, and
other remaining structure: less than 10.0%.

(3) The plated steel material according to the above (1) or (2), wherein the chemical composition of the plating layer comprises, by mass %,
Al: 35.00 to 50.00% and
Mg: 9.00 to 15.00%.

(4) The plated steel material according to any one of the above (1) to (3), wherein the area ratio of the acicular Al—Zn—Si—Ca phase in the surface structure is 8.0% or more.

Advantageous Effects of Invention

According to the present invention, it is possible to provide a plated steel material improved in LME resistance and hydrogen penetration resistance and, further, excellent in corrosion resistance after hot stamping.

DESCRIPTION OF EMBODIMENTS

<Plated Steel Material>

The plated steel material according to an embodiment of the present invention comprises a steel base material and a plating layer formed on a surface of the steel base material, wherein the plating layer has a chemical composition comprising, by mass %, Al: 25.00 to 75.00%,
Mg: 7.00 to 20.00%,
Si: 0.10 to 5.00%,
Ca: 0.05 to 5.00%,
Sb: 0 to 0.50%,
Pb: 0 to 0.50%,
Cu: 0 to 1.00%,
Sn: 0 to 1.00%,
Ti: 0 to 1.00%,
Sr: 0 to 0.50%,
Cr: 0 to 1.00%,
Ni: 0 to 1.00%,
Mn: 0 to 1.00%, and
balance: Zn and impurities, and
in a surface structure of the plating layer, there is, by area ratio, 2.0% or more of an acicular Al—Zn—Si—Ca phase.

For example, if using a conventional Zn-based plated steel material or an Al—Zn-based plated steel material for hot stamping, in general the plated steel material will be heated in the hot stamping to about 900° C. or a higher temperature than that. Zn has a boiling point of about 907° C., which is relatively low, therefore at such a high temperature, the Zn in the plating layer will evaporate or melt, resulting in the partial formation of a high concentration Zn liquid phase in the plating layer and the penetration of the liquid Zn into the crystal grain boundaries in the steel in some cases causing liquid metal embrittlement (LME) cracking.

On the other hand, in a conventional Al plated steel material not containing Zn, LME cracking due to Zn will not occur, but at the time of heating in the hot stamping, the water vapor in the atmosphere will sometimes be reduced by the Al in the plating layer, resulting in the generation of hydrogen. As a result, the generated hydrogen will sometimes penetrate the steel material and cause hydrogen embrittlement cracking. Further, in an Al—Zn-based plated steel material as well, since Zn has a relatively low boiling point as explained above, at the time of hot stamping at a 900° C. or higher temperature, a part of Zn will evaporate and sometimes will react with the water vapor in the atmosphere and cause the generation of hydrogen. In such a case, hydrogen embrittlement cracking is liable to occur due to hydrogen penetrating the steel material due to not only Al, but also Zn. In addition, from the viewpoint of improvement of the corrosion resistance, regarding the Mg and other elements which are added to the Zn-based plated steel material or Al—Zn-based plated steel material, sometime parts thereof will evaporate at the time of heating in hot stamping at a high temperature and, in the same way as the case of Zn, cause production of hydrogen triggering hydrogen embrittlement cracking.

Further, if the elements Zn and/or Mg having the effect of improving the corrosion resistance at the time of hot stamping at a high temperature evaporate and parts of those elements are lost, naturally a problem will arise in that it is not possible to maintain sufficient corrosion resistance in the body after hot stamping. Furthermore, if the Zn and/or Mg in the plating layer evaporate and are lost, in the plating layer after the hot stamping, relatively large amounts of Al—Fe-based intermetallic compounds and/or Zn—Fe-based intermetallic compounds will be formed between the Fe which had been diffused from the base iron and the Al and/or Zn in the plating layer. These intermetallic compounds become causes of red rust in corrosive environments.

Therefore, the inventors studied the corrosion resistance, LME resistance, and hydrogen penetration resistance in plated steel materials which include Al—Zn—Mg-based plating layers for use in hot stamping. As a result, the inventors discovered that by establishing the presence of an acicular Al—Zn—Si—Ca phase in a predetermined amount at the surface structure of an Al—Zn—Mg-based plating layer having a predetermined chemical composition, it is possible to remarkably reduce or suppress LME and penetration of hydrogen into the steel material and possible to achieve sufficient corrosion resistance in a body after hot stamping. Below, this will be explained more specifically while referring to the drawings.

Figure 1:
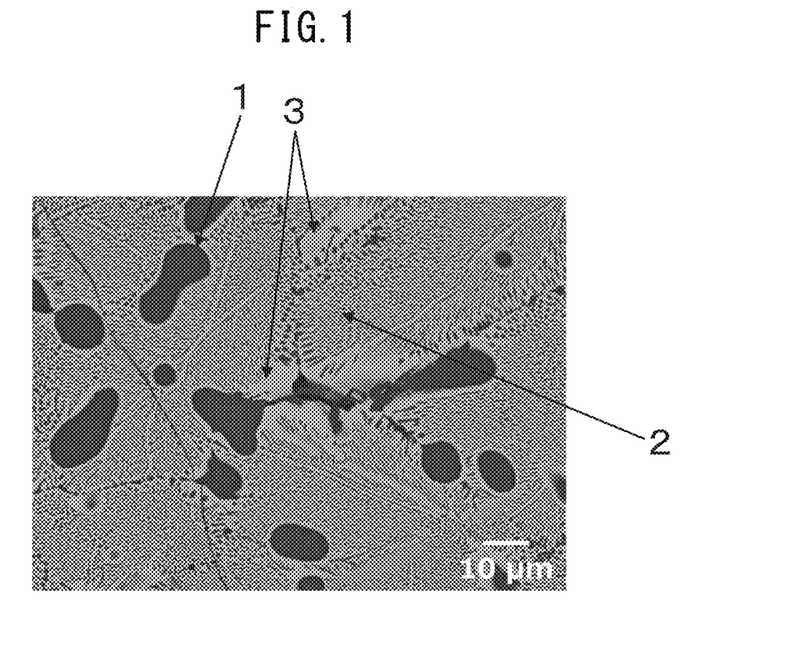
FIG. 1 shows a backscattered electron image (BSE image) of a scanning electron microscope (SEM) of a plating layer surface in a conventional Al—Zn—Mg-based plated steel material.

FIG. 1 shows a backscattered electron image (BSE image) of a scanning electron microscope (SEM) of a plating layer surface in a conventional Al—Zn—Mg-based plated steel material. Referring to FIG. 1, it will be understood that the surface structure of the plating layer is mainly comprised of α phase 1 of a large black structure, α/τ eutectic phase 2 in which an α phase of a small black structure, more specifically a small rod-shaped black structure, is dispersed in a τ phase of a matrix phase, and clumped τ phase 3 not forming such an eutectic phase with the α phase. The α phase is a structure containing Al and Zn as main constituents, while the τ phase is a structure containing Mg, Zn, and Al as main constituents. In the present invention, "main constituents" refer to elements forming the main constituents with the total contents of more than 50%. In the conventional Al—Zn—Mg-based plated steel material as shown in FIG. 1, since there are either no acicular Al—Zn—Si—Ca phase or the ratio of the phase (area ratio, etc.) is not sufficient, Zn and Mg evaporate during the heating in the hot stamping, LME and penetration of hydrogen into the steel material occur, and further the loss of Zn and Mg due to evaporation of these elements causes the corrosion resistance after hot stamping to greatly fall.

Figure 2:
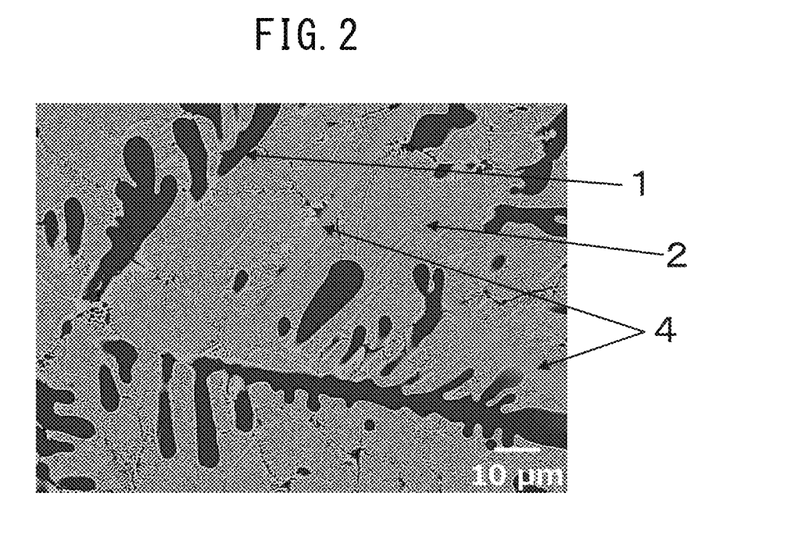
FIG. 2 shows a backscattered electron image (BSE image) of a scanning electron microscope (SEM) of a plating layer surface in a plated steel material according to the present invention (Example 10).
Figure 3:
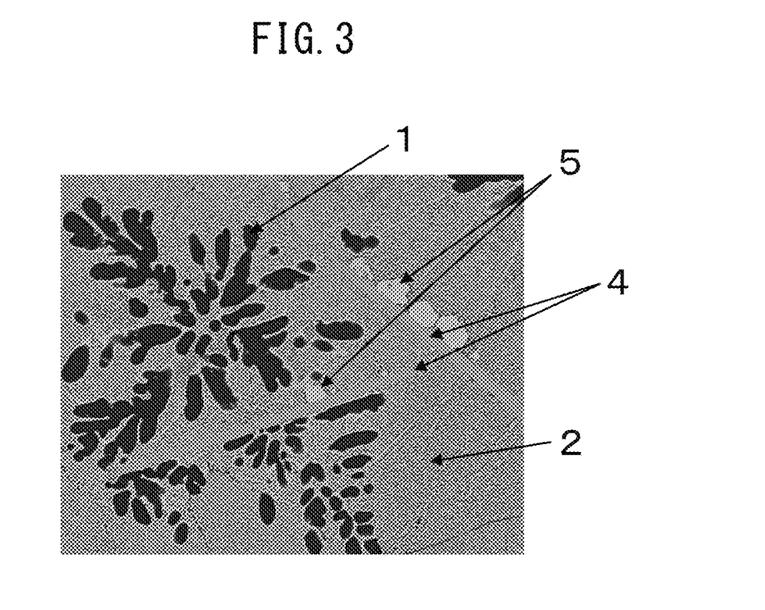
FIG. 3 shows a BSE image of an SEM of a plating layer surface in a plated steel material according to the present invention (Example 7).

FIG. 2 shows a backscattered electron image (BSE image) of a scanning electron microscope (SEM) of a plating layer surface in a plated steel material according to the present invention (Example 10). Referring to FIG. 2, in contrast to the case of FIG. 1, it will be understood that in the surface structure of the plating layer, aside from α phase 1 (a dendrite structure in FIG. 2) and α/τ eutectic phase 2, acicular Al—Zn—Si—Ca phase 4 is present in a relatively large amount. Further, FIG. 3 shows a BSE image of an SEM of a plating layer surface in a plated steel material according to the present invention (Example 7). Referring to FIG. 3, it will be understood that in the surface structure of the plating layer, in addition to the α phase 1, α/τ eutectic phase 2, and acicular Al—Zn—Si—Ca phase 4, $MgZn_2$ phase 5 may be further present. Whatever the case, in the plated steel material according to the present invention, due to the acicular Al—Zn—Si—Ca phase 4 as shown in FIGS. 2 and 3 being present in an area ratio of 2.0% or more, occurrence of LME and penetration of hydrogen into the steel material can be remarkably reduced or suppressed and sufficient corrosion resistance can be achieved even in the body after hot stamping.

While not intending to be bound by any specific theory, due to the presence of the acicular Al—Zn—Si—Ca phase 4 in the surface structure of the plating layer, at the time of heating in the hot stamping, it is believed that the Ca leached out from the acicular Al—Zn—Si—Ca phase 4 is preferentially oxidized by the oxygen in the atmosphere and forms a dense Ca-based oxide film at the surface-most part of the plating layer. In other words, it is believed that the acicular Al—Zn—Si—Ca phase 4 may function as a supply source of Ca for forming an Ca-based oxide film at the time of high temperature heating in hot stamping. It is believed that such a Ca-based oxide film, more specifically a Ca— and Mg-containing oxide film, functions as a barrier layer, and therefore can reduce or suppress the evaporation of Zn and Mg in the plating layer to the outside and the penetration of hydrogen from the outside and, further, can remarkably suppress the drop in corrosion resistance due to evaporation of Zn and Mg to the outside. As a result, according to the present invention, it is possible to provide a plated steel material improved in LME resistance and hydrogen penetration resistance and, further, excellent in corrosion resistance after hot stamping.

Below, the plated steel material according to an embodiment of the present invention will be explained in detail. In the following explanation, the "%" relating to the contents of the constituents means "mass %" unless otherwise indicated.

[Steel Base Material]

The steel base material according to the embodiment of the present invention may be a material having any thickness and composition. It is not particularly limited, but, for example, is preferably a material having a thickness and composition suitable for application to hot stamping. Such a steel base material is known, and may include, for example, a steel sheet having a 0.3 to 2.3 mm thickness and comprising, by mass %, C: 0.05 to 0.40%, Si: 0.50% or less, Mn: 0.50 to 2.50%, P: 0.03% or less, S: 0.010% or less, sol. Al: 0.10% or less, N: 0.010% or less, and a balance of: Fe and impurities (for example, a cold rolled steel sheet), etc. Below, the constituents contained in the steel base material preferably applied in the present invention will be explained in detail.

[C: 0.05 to 0.40%]

Carbon (C) is an element effective for raising the strength of a hot stamped body. However, if the C content is too great, the hot stamped body will sometimes fall in toughness. Therefore, the C content is 0.05 to 0.40%. The C content is preferably 0.10% or more, more preferably 0.13% or more. The C content is preferably 0.35% or less.

[Si: 0 to 0.50%]

Silicon (Si) is an element effective for deoxidizing steel. However, if the Si content is too great, the Si in the steel diffuses at the time of heating in the hot stamping and forms oxides at the steel material surface. As a result, the efficiency of phosphate treatment sometimes falls. Further, Si is an element making the $Ac_3$ point of the steel rise. For this reason, since the heating temperature of the hot stamping has to be the $Ac_3$ point or more, if the amount of Si becomes excessive, the heating temperature of the hot stamping of the steel will inevitably become higher. In other words, steel with a large amount of Si will be heated to a higher temperature at the time of hot stamping and, as a result, Zn, etc., in the plating layer will unavoidably evaporate. To avoid such a situation, the Si content is 0.50% or less. The Si content is preferably 0.30% or less, more preferably 0.20% or less. The Si content may also be 0%, but to obtain the effect of deoxidation, etc., the lower limit value of the Si content, while changing depending on the desired deoxidation level, is generally 0.05%.

[Mn: 0.50 to 2.50%]

Manganese (Mn) raises the hardenability and raises the strength of the hot stamped body. On the other hand, even if including Mn in excess, the effect become saturated. Therefore, the Mn content is 0.50 to 2.50%. The Mn content is preferably 0.60% or more, more preferably 0.70% or more. The Mn content is preferably 2.40% or less, more preferably 2.30% or less.

[P: 0.03% or less]

Phosphorus (P) is an impurity contained in steel. P segregates at the crystal grain boundaries to cause a drop in the toughness of the steel and causes a drop in the delayed fracture resistance. Therefore, the P content is 0.03% or less. The P content is preferably as small as possible and is preferably 0.02% or less. However, excessive reduction of the P content invites a rise in costs, therefore the P content is preferably 0.0001% or more. The inclusion of P is not essential, therefore the lower limit of the P content is 0%.

[S: 0.010% or less]

Sulfur (S) is an impurity contained in steel. S forms sulfides to cause a drop in the toughness of the steel and cause a drop in the delayed fracture resistance. Therefore, the S content is 0.010% or less. The S content is preferably as small as possible and is preferably 0.005% or less. However, excessive reduction of the S content invites a rise in costs, therefore the S content is preferably 0.0001% or more. The inclusion of S is not essential, therefore the lower limit of the S content is 0%.

[sol. Al: 0 to 0.10%]

Aluminum (Al) is effective for deoxidation of steel. However, excessive inclusion of Al causes the $Ac_3$ point of the steel material to rise and accordingly the heating temperature of the hot stamping becomes higher and Zn, etc., in the plating layer unavoidably evaporate. Therefore, the Al content is 0.10% or less, preferably 0.05% or less. The Al content may also be 0%, but to obtain the effect of deoxidation, etc., the Al content may be 0.01% or more. In this Description, the Al content means the content of so-called acid-soluble Al (sol. Al).

[N: 0.010% or less]

Nitrogen (N) is an impurity unavoidably contained in steel. N forms nitrides to cause a drop in the toughness of the steel. If boron (B) is further contained, N bonds with B to cause a reduction in the amount of B in solid solution and cause a drop in the hardenability. Therefore, the N content is 0.010% or less. The N content is preferably as small as possible and is preferably 0.005% or less. However, excessive reduction of the N content invites a rise in costs, therefore the N content is preferably 0.0001% or more. The inclusion of N is not essential, therefore the lower limit of the N content is 0%.

The basic chemical composition of the steel base material suitable for use in the embodiment according to the present invention is as explained above. Further, the above steel base material may optionally contain one or more of B: 0 to 0.005%, Ti: 0 to 0.10%, Cr: 0 to 0.50%, Mo: 0 to 0.50%, Nb: 0 to 0.10%, and Ni: 0 to 1.00%. Below, these elements will be explained in detail. The inclusion of these element is not essential, therefore the lower limits of the contents of the elements are 0%.

[B: 0 to 0.005%]

Boron (B) raises the hardenability of steel and raises the strength of the steel material after hot stamping, therefore may be included in the steel base material. However, even if including B in excess, the effect becomes saturated. Therefore, the B content is 0 to 0.005%. The B content may also be 0.0001% or more.

[Ti: 0 to 0.10%]

Titanium (Ti) can bond with nitrogen (N) to form nitrides and keep the hardenability from dropping due to formation of BN. Further, due to the pinning effect, Ti can refine the austenite grain size and raise the toughness, etc., of the steel material at the time of heating in hot stamping. However, even if including Ti in excess, the effect becomes saturated. Further, if Ti nitrides precipitate in excess, sometimes the toughness of the steel will fall. Therefore, the Ti content is 0 to 0.10%. The Ti content may be 0.01% or more.

[Cr: 0 to 0.50%]

Chromium (Cr) is effective for raising the hardenability of steel and raising the strength of the hot stamped body. However, if the Cr content is excessive and a large amount of Cr carbides which are difficult to melt at the time of heating in hot stamping are formed, it becomes difficult for the steel to transform to austenite, and conversely the hardenability falls. Therefore, the Cr content is 0 to 0.50%. The Cr content may also be 0.10% or more.

[Mo: 0 to 0.50%]

Molybdenum (Mo) raises the hardenability of steel. However, even if including Mo in excess, the above effect becomes saturated. Therefore, the Mo content is 0 to 0.50%. The Mo content may also be 0.05% or more.

[Nb: 0 to 0.10%]

Niobium (Nb) is an element which forms carbides to refine the crystal grains at the time of hot stamping and raise the toughness of the steel. However, if including Nb in excess, the above effect becomes saturated and further the hardenability falls. Therefore, the Nb content is 0 to 0.10%. The Nb content may also be 0.02% or more.

[Ni: 0 to 1.00%]

Nickel (Ni) is an element able to suppress embrittlement caused by molten Zn at the time of heating in hot stamping. However, even if including Ni in excess, the effect becomes saturated. Therefore, the Ni content is 0 to 1.00%. The Ni content may also 0.10% or more.

In the steel base material according to the embodiment of the present invention, the balance other than the above constituents is comprised of Fe and impurities. The "impurities" in the steel base material mean constituents entering due to various factors in the production process, first and foremost the raw materials such as the ore and scrap, when industrially producing the plated steel material according to the embodiment of the present invention, and not intentionally added to the plated steel material.

[Plating Layer]

According to the embodiment of the present invention, a plating layer is formed on the surface of the above steel base material. For example, if the steel base material is a steel sheet, the plating layer is formed on at least one surface of the steel sheet, i.e., one surface or both surfaces of the steel sheet. The plating layer has the following average composition.

[Al: 25.00 to 75.00%]

Al is an element required for formation of the acicular Al—Zn—Si—Ca phase, α phase, and α/τ eutectic phase in the plating layer. If the Al content is less than 25.00%, it becomes difficult to make the acicular Al—Zn—Si—Ca phase form in an sufficient amount, therefore the Al content is 25.00% or more. A plated steel sheet must be provided with cold workability enabling it to withstand the bending operations, etc., up until being supplied to the hot stamping. To sufficiently secure this cold workability, the Al content is preferably 30.00% or more or 35.00% or more. Furthermore, to reliably form the τ phase, the Al content is preferably 40.00% or more. On the other hand, if the Al content is more than 75.00%, $Al_4Ca$ and other intermetallic compounds are preferentially formed and as a result formation of the acicular Al—Zn—Si—Ca phase becomes difficult. Therefore, the Al content is 75.00% or less, preferably 65.00% or less, more preferably 50.00% or less, most preferably 45.00% or less.

[Mg: 7.00 to 20.00%]

Mg is an element effective for improving the corrosion resistance of the plating layer and improving the coating blistering, etc. Further, if the Mg content is too low, the equilibrium balance is lost and it becomes difficult to form the acicular Al—Zn—Si—Ca phase in a sufficient amount. Further, an $MgZn_2$ phase easily forms and the cold workability also falls. Therefore, the Mg content is 7.00% or more. From the viewpoint of the corrosion resistance, the Mg content is preferably 9.00% or more. On the other hand, if the Mg content is too high, an excessive sacrificial corrosion action tends to cause coating blistering and flow rust to rapidly become larger. Therefore, the Mg content is 20.00% or less, preferably 15.00 or less.

[Si: 0.10 to 5.00%]

Si is an element essential for formation of the acicular Al—Zn—Si—Ca phase. To make a sufficient amount of the acicular Al—Zn—Si—Ca phase form, the Si content is 0.10% or more, preferably 0.40% or more. On the other hand, if the Si content is excessive, an $Mg_2Si$ phase is formed at the interface of the steel base material and the plating layer and the corrosion resistance greatly deteriorates. Further, if the Si content is excessive, the $Mg_2Si$ phase is preferentially formed and as a result it becomes difficult to make the acicular Al—Zn—Si—Ca phase form in a sufficient amount. Therefore, the Si content is 5.00% or less, preferably 1.50% or less, more preferably 1.00% or less.

[Ca: 0.05 to 5.00%]

Ca is an element essential for causing the formation of the acicular Al—Zn—Si—Ca phase. Further, Ca can suppress the formation of the top dross formed on the plating bath at the time of production. To enable a sufficient amount of the acicular Al—Zn—Si—Ca phase to be formed, the Ca content is 0.05% or more, preferably 0.40% or more. On the other hand, if the Ca content is excessive, $Al_4Ca$ and other intermetallic compounds are preferentially formed and as a result it becomes difficult to make the acicular Al—Zn—Si—Ca phase form in a sufficient amount. Therefore, the Ca content is 5.00% or less, preferably 3.00% or less, more preferably 1.50% or less.

The chemical composition of the plating layer is as explained above. Furthermore, the plating layer may optionally contain one or more of Sb: 0 to 0.50%, Pb: 0 to 0.50%, Cu: 0 to 1.00%, Sn: 0 to 1.00%, Ti: 0 to 1.00%, Sr: 0 to 0.50%, Cr: 0 to 1.00%, Ni: 0 to 1.00%, and Mn: 0 to 1.00%. While not particularly limited to this, from the viewpoint of causing the actions and functions of the above basic constituents forming the plating layer to be sufficiently manifested, the total contents of these elements is preferably 5.00% or less, more preferably 2.00% or less. Below, these elements will be explained in detail.

[Sb: 0 to 0.50%, Pb: 0 to 0.50%, Cu: 0 to 1.00%, Sn: 0 to 1.00%, and Ti: 0 to 1.00%]

Sb, Pb, Cu, Sn, and Ti can be contained in the $MgZn_2$ phase or τ phase present in the plating layer, but if within predetermined ranges of contents, do not detrimentally affect the performance of the plated steel material. However, if the contents of the elements are excessive, at the time of heating in the hot stamping, sometimes oxides of these elements will form at the surface-most part of the plating layer. In such a case, the phosphate chemical conversion treatment will become poor and the corrosion resistance after coating will deteriorate. Furthermore, if Pb and Sn contents become excessive, the LME resistance will tend to fall. Therefore, the contents of Sb and Pb are 0.50% or less, preferably 0.20% or less, while the contents of Cu, Sn, and Ti are 1.00% or less, preferably 0.80% or less, more preferably 0.50% or less. On the other hand, the contents of these elements may also be 0.01% or more. Inclusion of these elements is not essential. The lower limits of the contents of these elements are 0%.

[Sr: 0 to 0.50%]

Sr can be included in the plating bath at the time of production of the plating layer so as to suppress the formation of the top dross formed on the plating bath. Further, Sr tends to suppress oxidation by air at the time of heating in hot stamping, and therefore can suppress color changes in the body after hot stamping. These effects are exhibited even in small amounts, therefore the Sr content may be 0.01% or more. Further, if Sr is added, it will sometimes be contained in the acicular Al—Zn—Si—Ca phase. Even if a small amount of Sr is included in the acicular Al—Zn—Si—Ca phase, it will not greatly affect the performance after hot stamping. However, if the Sr content becomes greater, the corrosion resistance after hot stamping will tend to fall. Therefore, the Sr content is 0.50% or less, preferably 0.10% or less.

[Cr: 0 to 1.00%, Ni: 0 to 1.00%, and Mn: 0 to 1.00%]

Cr, Ni, and Mn concentrate near the interface of the plating layer and the steel base material and have the effect of eliminating spangles of the plating layer surface, etc. To obtain such an effect, the contents of Cr, Ni, and Mn are preferably respectively 0.01% or more. On the other hand, these elements are included in the α phase and the α/τ eutectic phase in the plating layer, but if the contents of these elements are excessive, the coating blistering and flow rust become greater and the corrosion resistance tends to deteriorate. Therefore, the contents of Cr, Ni, and Mn are respectively 1.00% or less, preferably 0.50% or less, more preferably 0.10% or less.

[Balance: Zn and Impurities]

The balance in the plating layer aside from the above constituents is comprised of Zn and impurities. Zn is present in the plating layer as the acicular Al—Zn—Si—Ca phase, the α phase having Al and Zn as main constituents, and the α/τ eutectic phase (eutectic phase of above α phase and τ phase having Mg, Zn, and Al as main constituents). Therefore, Zn is an element essential for suppressing the occurrence of LME and penetration of hydrogen into the steel in the hot stamping process and further maintaining sufficient corrosion resistance in the body after hot stamping. If the Zn content is less than 10.00%, sometimes a sufficient amount of the acicular Al—Zn—Si—Ca phase cannot be formed at the surface structure of the plating layer. As a result, during the heating in the hot stamping, Zn and Mg evaporate, LME and penetration of hydrogen into the steel material occur, and further the disappearance of Zn and Mg due to the evaporation of these elements is liable to cause the corrosion resistance after hot stamping to greatly fall. Therefore, the Zn content is preferably 10.00% or more. The lower limit of the Zn content may be 20.00%, 30.00%, 40.00%, or 50.00%. The upper limit of the Zn content does not have to be particularly determined, but may be 65.00%, 60.00%, or 55.00%. The total of the Al content and the Zn content does not have to be particularly determined, but the total may be 70.00% or more. In accordance with need, the total may be 75.00% or more, 78.00% or more, 80.00% or more, 83.00% or more, or 85.00% or more.

Further, the "impurities" in the plating layer mean constituents entering due to various factors in the production process, first and foremost the raw materials, when producing the plating layer, and not intentionally added to the plating layer. For example, the impurities in the plating layer may include Fe and other elements leaching out from the steel base material, etc., to the inside of the plating bath. The content of such Fe is generally 0 to 5.00%, more specifically 1.00% or more and 3.00% or less or 2.50% or less. In the plating layer, the impurities may contain elements other than the elements explained above in trace amounts to an extent not detracting from the effect of the present invention.

In the present invention, the chemical composition of the plating layer may be basically deemed to be identical to the chemical composition in the plating bath for forming the plating layer except for the impurities entering when forming the plating layer.

The thickness of the plating layer may be, for example, 3 to 50 μm. Further, if the steel base material is a steel sheet, the plating layer may be provided at both surfaces of the steel sheet or may be provided at only one surface. The amount of deposition of the plating layer is not particularly limited, but for example may be 10 to 170 $g/m^2$ per surface. The lower limit may be 20 or 30 $g/m^2$ and the upper limit may be 150 or 130 $g/m^2$. In the present invention, the amount of deposition of the plating layer is determined from the change in weight before and after acid washing by dissolving the plating layer in an acidic solution to which an inhibitor for inhibiting corrosion of the base iron has been added.

[Surface Structure of Plating Layer]

In the surface structure of the plating layer, there is, by area ratio, 2.0% or more of the acicular Al—Zn—Si—Ca phase.

[Acicular Al—Zn—Si—Ca Phase]

The acicular Al—Zn—Si—Ca phase is an intermetallic compound having Al, Zn, Si, and Ca as main constituents. In the surface structure of the plating layer, the presence of acicular Al—Zn—Si—Ca phase is established and, as explained above, at the time of heating in the hot stamping, the Ca leached out from the acicular Al—Zn—Si—Ca phase is preferentially oxidized with the oxygen in the atmosphere whereby an oxide film is formed on the surface-most part of the plating layer. Further, it is believed that this oxide film functions as a barrier layer, and therefore can reduce or suppress the evaporation of Zn and Mg in the plating layer to the outside and the penetration of hydrogen from the outside and, further, this oxide film can remarkably suppress the drop in corrosion resistance due to evaporation of Zn and Mg to the outside. As a result, it is believed that the LME resistance and hydrogen penetration resistance are improved.

It is believed that such a Ca-based oxide film, for example, a Ca— and Mg-containing oxide film, functions as a barrier layer and due to this, the evaporation of the Zn and Mg in the plating layer to the outside and the penetration of hydrogen from the outside can be reduced or suppressed and, furthermore, the drop in the corrosion resistance due to evaporation of Zn and Mg to the outside can be remarkably suppressed. As a result, according to the present invention, it becomes possible to provide a plated steel material improved in LME resistance and hydrogen penetration resistance and, further, excellent in corrosion resistance after hot stamping. To obtain such an effect, the area ratio of the acicular Al—Zn—Si—Ca phase in the surface structure of the plating layer has to be 2.0% or more. The larger the area ratio of the acicular Al—Zn—Si—Ca phase, the greater the effect of reducing or suppressing the evaporation of the Zn and Mg in the plating layer to the outside and the penetration of hydrogen from the outside. Therefore, the area ratio of the acicular Al—Zn—Si—Ca phase is preferably 4.0% or more or 6.0% or more, more preferably 8.0% or more or 10.0% or more. In particular, by making the area ratio of the acicular Al—Zn—Si—Ca phase 8.0% or more, it becomes possible to form a dense Ca-based oxide film, for example, a Ca— and Mg-containing oxide film, in a sufficient amount and, as a result, becomes possible to remarkably improve the corrosion resistance, in particular the long-term corrosion resistance. The upper limit value of the area ratio of the acicular Al—Zn—Si—Ca phase is not particularly limited, but in general may be 20.0% or less, 18.0% or less, or 15.0% or less.

The acicular Al—Zn—Si—Ca phase can be easily identified from the shading of the structures and characteristic acicular shape in the BSE image of the SEM as shown in FIG. 1, FIG. 2, and FIG. 3. The area ratio can be measured from the results. The chemical composition of the acicular Al—Zn—Si—Ca phase includes, by mass %, an Al content of 36.0 to 50.0%, Zn content of 20.0 to 80.0%, Si content of 1.0 to 10.0%, Ca content of 5.0 to 25.0%, and a total of contents of other elements as the balance of 5.0% or less. For this reason, if not possible to identify the acicular Al—Zn—Si—Ca phase from the BSE image of the SEM or if desiring to confirm it is an acicular Al—Zn—Si—Ca phase, SEM-EDS (Energy Dispersive X-ray Spectroscopy) or EPMA is used to analyze the chemical composition of the structure. If the chemical composition obtained as a result is within the above range, it can be judged that the structure is an acicular Al—Zn—Si—Ca phase. The location where the chemical composition is analyzed at the time of SEM-EDS mapping may be single location of the structure being examined, but for improving the precision of analysis, it is preferable to render judgment by the average value of the chemical compositions of at least three locations of the structure.

The surface structure of the plating layer according to the embodiment of the present invention is one in which, except for there being, by area ratio, 2.0% or more of the acicular Al—Zn—Si—Ca phase, the area ratios of the later explained α phase, α/τ phase, and other phases themselves are within the ranges of the usual surface structure of the plating layer having the above chemical composition. For this reason, in the present invention, the surface structure other than the acicular Al—Zn—Si—Ca phase does not have to be prescribed. By way of reference, the structure is described below.

[αPhase]

The α phase is a structure having Al and Zn as main constituents. A plated steel material is sometimes used for bending or other cold working before being used for hot stamping. The α phase is a solid solution and has ductility. Therefore, the α phase can function to keep the plating layer from separating from the steel base material at the time of such cold working. To secure cold workability, the area ratio of the α phase in the surface structure of the plating layer is preferably 5.0% or more, more preferably 10.0% or more or 15.0% or more or 20.0% or more. On the other hand, if the area ratio of the α phase becomes more than 80.0%, sometimes a sufficient area ratio of the acicular Al—Zn—Si—Ca phase cannot be secured and it becomes difficult to suppress evaporation of Zn and Mg and hydrogen penetration at the time of the heating in hot stamping. Therefore, the area ratio of the α phase is preferably 80.0% or less, more preferably 70.0% or less or 60.0% or less.

The α phase can be easily identified from the shading of the structures and characteristic shape in the BSE image of the SEM as shown in FIG. 1, FIG. 2, and FIG. 3. The area ratio can be measured from the results. The chemical composition of the α phase includes, by mass %, an Al content of 20.0 to 89.9%, Zn content of 0.1 to 70.0%, Mg content of 0 to 5.0%, total of Al content and Zn content of 90.0% or more, and total of contents of other elements as the balance of 1.00% or less. For this reason, if not possible to identify the α phase from the BSE image of the SEM or if desiring to confirm it are an α phase, SEM-EDS or EPMA is used to analyze the chemical composition of the structure. If the chemical composition obtained as a result is within the above range, it can be judged that the structure is an α phase. The location where the chemical composition is analyzed at the time of SEM-EDS mapping may be single location of the structure being examined, but for improving the precision of analysis, it is preferable to render judgment by the average value of the chemical compositions of at least three locations of the structure.

[α/τ Eutectic Phase]

α/τ eutectic phase is comprised of the above α phase and a τ phase of a structure having Mg, Al, and Zn as main constituents. The stoichichemical composition of the τ phase is $Mg_{3\ 2}(Zn,Al)_{4\ 9}$. There is a certain extent of freedom in the ratio of Al and Zn. The α/τ eutectic phase, as shown by reference numeral 2 in FIG. 2, have the form of a lamella structure comprising a small rod shaped α phase dispersed in the matrix phase of the τ phase. The α/τ eutectic phase contains both Mg and Zn, which are elements having the effect of improvement of the corrosion resistance, and therefore is a structure useful for securing the corrosion resistance after hot stamping. To make this effect of improvement of the corrosion resistance be reliably manifested, the area ratio of the α/τ eutectic phase in the surface structure of the plating layer is preferably 20.0% or more, more preferably 25.0% or more. On the other hand, if the area ratio of the α/τ eutectic phase is more than 90.0%, sometimes the cold workability will fall. Therefore, the area ratio of the α/τ eutectic phase is preferably 90.0% or less, more preferably 80.0% or less. The α/τ eutectic phase is a characteristic structure of a lamella structure comprising a small rod-shaped α phase dispersed in the matrix phase of the τ phase and can be easily identified as the α/τ eutectic phase without analyzing the chemical compositions of the α phase and τ phase forming the lamella structure. For this reason, in the plated steel material according to the present invention, analysis of the chemical composition of the α/τ eutectic phase is unnecessary.

[Other Phases]

In the surface structure of the plating layer, as the remaining structure, there may also be other phases besides the above three phases. The other phases are not particularly limited, but, for example, may include a clumped τ phase, $MgZn_2$ phase, and phases comprised of other compounds (for example, $Al_4Ca$, $Mg_2Si$, etc.). However, if the area ratios of the other phases in the surface structure of the plating layer become too high, sometimes it is not possible to secure a sufficient area ratio of acicular Al—Zn—Si—Ca phase and it becomes difficult to suppress evaporation of Zn and Mg and penetration by hydrogen at the time of heating in hot stamping. Therefore, the area ratios of the other phases of the remaining structure preferably total less than 10.0%, more preferably 5.0% or less or 4.0% or less, most preferably 3.0% or less. The presence of these phases (including compounds, same below) is not essential. The lower limits of the area ratios of these phases are all 0%. The remaining structure is within the range of the surface structure of the plating layer of a known plated steel material. For this reason, the area ratio of the remaining structure and the chemical composition or area ratio, etc., of each phase forming the remaining structure do not have to be particularly prescribed, but for reference, they are described below.

(Clumped τ Phase)

The clumped τ phase is a phase where Mg, Zn, and Al are the main constituents (provided, however, that total of Mg content, Zn content, and Al content be 90% or more) and which are sometimes formed in nonequilibrium solidification. The clumped τ phase tends to be formed more easily the higher the Mg content of the plating bath and are often formed adjoining the α/τ eutectic phase. The difference from the τ phase in the α/τ eutectic phase lies in the point that a lamella structure is not formed with the α phase. Therefore, if there is a region of the τ phase surrounded by the α phase and not forming the lamella structure with the α phase, the longest axis (major axis) of the region of the τ phase and the longest axis (minor axis) in the axes perpendicular to the major axis are measured and if the minor axis is 3 times or more of the distance between the α phases forming the α/τ eutectic phase (lamella distance), such a τ phase is defined as a clumped τ phase separate from the α/τ eutectic phase. The clumped τ phase is inherently brittle and is not a mixed phase structure with the α phase having plastic deformability like α/τ eutectic phase, therefore become causes of lowering the cold workability of the plating layer. If the area ratio of the clumped τ phase in the surface structure of the plating layer becomes 10.0% or more, in addition to an increase in the active Mg—Zn-based intermetallic compounds, a drop in the cold workability is sometimes invited. Therefore, the area ratio of the clumped τ phase in the surface structure of the plating layer is preferably less than 10.0%, more preferably 5.0% or less, most preferably 3.0% or less or 2.0% or less.

($MgZn_2$ Phase)

The $MgZn_2$ phase is α phase in which Mg and Zn are the main constituents (provided, however, that the total of the Mg content and Zn content be 90% or more) and is sometimes formed in nonequilibrium solidification. The $MgZn_2$ phase tends to be formed more easily the lower the Mg content of the plating bath. The $MgZn_2$ phase contains Mg and Zn, therefore also contribute to improvement of the corrosion resistance after hot stamping, but are inherently brittle, therefore if the area ratio of the $MgZn_2$ phase becomes 10.0% or more, sometimes a drop in the cold workability is invited. Therefore, the area ratio of the $MgZn_2$ phase in the surface structure of the plating layer is preferably less than 10.0%, more preferably 5.0% or less, most preferably 3.0% or less or 2.0% or less.

(Other Compounds)

Other compounds may include $Al_4Ca$ and $Mg_2Si$ and other intermetallic compounds. $Al_4Ca$ tends to be more easily formed the lower the Si content of the plating bath. Similarly $Mg_2Si$ tends to be more easily formed the lower the Ca content of the plating bath. These intermetallic compounds are all brittle, therefore if 5.0% or more, they sometimes invite a drop in the cold workability. Therefore, the area ratio of each compound of $Al_4Ca$ and $Mg_2Si$ in the surface structure of the plating layer are preferably less than 5.0%, more preferably 3.0% or less or 2.0% or less. $Al_4Ca$ sometimes contains Si.

In the present invention, the area ratio of each phase in the surface structure of the plating layer is determined in the following way. First, a prepared sample is cut into a 25 mm×15 mm size. The plating layer surface is photographed by a 1500× power by a scanning electron microscope (SEM). From the backscattered electron image (BSE image), the area ratio of each phase is measured by computer image processing. The average values of these measured values at any five fields (provided, however, that the measured area of each field is 400 $\mu m^2$ or more) are determined as the area ratios of the acicular Al—Zn—Si—Ca phase, α phase, α/τ eutectic phase, and other phases and compounds. In particular, the area ratio of the clumped τ phase is determined by measuring the area ratio of a region surrounded by boundary lines defined by the α phase present around the clumped τ phase using computer image processing.

In the present invention, there is no need to analyze the chemical compositions of the acicular Al—Zn—Si—Ca phase and α phase, but if not possible to identify the acicular Al—Zn—Si—Ca phase or α phase from the BSE image of the SEM or if desiring to confirm it is the acicular Al—Zn—Si—Ca phase or α phase, SEM-EDS or EPMA is used to analyze the chemical composition of the structure. If the chemical composition obtained as a result is within the above range, it can be judged that the structure is an α phase. The location where the chemical composition is analyzed at the time of SEM-EDS mapping may be single location of the structure being examined, but for improving the precision of analysis, it is preferable to render judgment by the average values of the chemical compositions of at least three locations of the structure.

<Method for Producing Plated Steel Material>

Next, a preferred method for producing the plated steel material according to the embodiment of the present invention will be explained. The following explanation is intended to illustrate a characteristic method for producing a plated steel material according to the embodiment of the present invention and is not intended to limit that plated steel material to one produced by a production method as explained below.

The above production method comprises forming the steel base material and forming a plating layer on the steel base material. Below, each step will be explained in detail.

[Step of Formation of Steel Base Material]

In the step of formation of the steel base material, for example, first, molten steel having the same chemical composition as that explained for the steel base material is produced. The produced molten steel is used to produce a slab by a casting method. Alternatively, the produced molten steel may be used to produce an ingot by the ingot making method. Next, the slab or ingot is hot rolled to produce the steel base material (hot rolled steel sheet). In accordance with need, the hot rolled steel sheet may be pickled, then the hot rolled steel sheet may be cold rolled. The obtained cold rolled steel sheet may be used as the steel base material.

[Step of Formation of Plating Layer]

Next, in the step of formation of the plating layer, a plating layer having the chemical composition explained above is formed on at least one surface of the steel base material, preferably on both surfaces.

More specifically, first, the above steel base material is reduced by heating in an $N_2$—$H_2$ mixed gas atmosphere at a predetermined temperature and time, for example, a temperature of 750 to 850° C., then is cooled in a nitrogen atmosphere or other inert atmosphere until near the plating bath temperature. Next, the steel base material is dipped in a plating bath having the same chemical composition as the chemical composition of the plating layer explained above for 0.1 to 60 seconds, then is pulled up and adjusted in amount of deposition of the plating layer to within a predetermined range by immediately blowing $N_2$ gas or air by the gas wiping method.

The chemical composition of the plating bath preferably has the chemical composition explained above for the plating layer and satisfies the following formula (1):

$$Zn/(Mg+3\times Ca) \leq 6.5 \qquad (1)$$

In formula (1), Zn, Mg, and Ca are contents (mass %) of the respective elements.

By satisfying formula (1), it becomes possible to more reliably ensure the presence of the acicular Al—Zn—Si—Ca phase at the surface structure of the plating layer in an area ratio of 2.0% or more. Therefore, it is possible to remarkably reduce or suppress LME and penetration of hydrogen in the steel material and achieve sufficient corrosion resistance even in the body after hot stamping.

Further, the amount of deposition of the plating layer is preferably 10 to 170 g/m² per surface. In the present step, as an aid to plating deposition, it is also possible to apply Ni preplating, Sn preplating, or other preplating. However, these preplatings cause changes in the alloying reactions, therefore the amount of deposition of the preplating is preferably 2.0 g/m² per surface or less.

Finally, by cooling the steel base material on which the plating layer is deposited in two stages, a plating layer containing the acicular Al—Zn—Si—Ca phase in the surface structure is formed on one surface or both surfaces of the steel base material. In the present method, suitably controlling the cooling conditions at the time the plating layer in the liquid phase state solidifies is extremely important in causing formation of the acicular Al—Zn—Si—Ca phase in a predetermined amount in the surface structure of the plating layer. More particularly, the specific value of the cooling speed can change according to the chemical composition of the plating layer, etc., but in order to make the acicular Al—Zn—Si—Ca phase reliably form in a predetermined amount, it is effective that the steel base material on which the plating layer is deposited first be cooled by a 14° C./sec or more, preferably a 15° C./sec or more, average cooling speed from the bath temperature (in general, 500 to 700° C.) to 450° C., then be cooled by a 5.5° C./sec or less, preferably 5° C./sec or less average cooling speed from 450° C. to 350° C. By using such cooling conditions, i.e., two-stage cooling of fast cooling and slow cooling, a supersaturated state is created at the time of the initial fast cooling to render the material a state in which nuclei of the acicular Al—Zn—Si—Ca phase is easily formed and cause the formation of a large amount of nuclei, then, at the time of the slow cooling, those nuclei slowly grow, whereby in the surface structure of the plating layer, an area ratio of 2.0% or more of the acicular Al—Zn—Si—Ca phase is formed, in particular, is formed dispersed. As a result, even in the case of heating at 900° C. or more in hot stamping, it becomes possible to suppress evaporation of Zn and Mg. It is possible to remarkably reduce or suppress LME and penetration of hydrogen into the steel material and to achieve sufficient corrosion resistance even in the body after hot stamping.

If the point of change of the cooling speed of the fast cooling and slow cooling becomes higher than about 450° C., sometimes nuclei of the acicular Al—Zn—Si—Ca phase are not sufficiently formed. On the other hand, if the point of change of cooling becomes lower than about 450° C., sometimes the nuclei formed cannot sufficiently grow. In both cases, it becomes difficult to establish the presence of the acicular Al—Zn—Si—Ca phase in a predetermined amount, more specifically an amount of an area ratio of 2.0% or more, in the surface structure of the plating layer. Therefore, the point of change of the cooling speed, as explained later, has to be selected from the range of 425 to 475° C. To reliably form 2.0% or more of the acicular Al—Zn—Si—Ca phase, as explained above, it is preferably 450° C.

The plated steel material according to the embodiment of the present invention is suitable for application to hot stamping. The hot stamping can be performed by a method known to a person skilled in the art. It is not particularly limited, but, for example, the steel base material provided with the plating layer can be loaded into a heating furnace, heated to the $Ac_3$ point or higher temperature, in general a temperature of about 800 to 1200° C., in particular about 850 to 1000° C., held there for a predetermined time, then hot stamped.

EXAMPLES

Below, examples will be used to explain the present invention in more detail, but the present invention is not limited to these examples in any way.

Example A

In the present example, plated steel materials according to embodiments of the present invention were produced under various conditions and were investigated for characteristics when applying these to hot stamping.

First, molten steel comprising, by mass %, a C content of 0.20%, Si content of 0.20%, Mn content of 1.30%, P content of 0.01%, S content of 0.005%, sol. Al content of 0.02%, N content of 0.002%, B content of 0.002%, Ti content of 0.02%, Cr content of 0.20%, and balance of Fe and impurities was used to produce a slab by continuous casting. Next, the slab was hot rolled to produce hot rolled steel sheet, the hot rolled steel sheet was pickled, then the sheet was cold rolled to produce a cold-rolled steel sheet (steel base material) having a 1.4 mm sheet thickness.

Next, the produced steel base material was cut to 100 mm×200 mm, then the steel base material was plated using a batch type hot dip coating apparatus made by Rhesca. More specifically, first, the produced steel base material was reduced by heating in a furnace with an oxygen concentration of 20 ppm or less in an $N_2$-5% $H_2$ mixed gas atmosphere at 800° C., then was cooled in $N_2$ down to the plating bath temperature +20° C. Next, the steel base material was dipped in a plating bath having the chemical composition shown in Table 1 for about 3 seconds, then was pulled up by a pull-up speed of 20 to 200 mm/sec and adjusted by N₂ gas wiping to an amount of deposition of the plating layer of the value shown in Table 1. Next, the steel base material on which the plating layer was deposited was cooled in two stages under the conditions shown in Table 1, whereby a plated steel material on the two surfaces of which plating layer was formed was obtained. The sheet temperature was measured using a thermocouple spot welded to the center part of the steel base material.

Next, the obtained plated steel material was hot stamped. Specifically, the hot stamping was performed by loading the plated steel material into a heating furnace, then heating it to a temperature of 900° C. or more (a temperature of Ac₃ point or more of plated steel material) and holding it there for a predetermined time, then hot pressing it by a die equipped with a water cooling jacket. As the heat treatment conditions at the time of hot stamping (HS), either of the following conditions X and Y was selected. The quenching by the die was controlled to give a cooling speed of 50° C./sec or more up to about the martensite transformation start point (410° C.).

X: Holding at 900° C. for 1 minute
Y: Holding at 900° C. for 5 minutes

TABLE 1

| | | Chemical composition of plated layer (mass %) | | | | | | Zn/ | Bath temperature (° C.) | Bath temperature to 450° C. average cooling speed (° C./sec) | 450 to 350° C. average cooling speed (° C./sec) | Amount of deposition of plated layer per surface (g/m²) | HS heat treatment |
|---|---|---|---|---|---|---|---|---|---|---|---|---|---|
| No. | Class | Zn | Al | Mg | Si | Ca | Other Type | Total | (Mg + 3 × Ca) | | | | | |
| 1 | Comp. ex. | 59.80 | 24.00 | 15.00 | 0.40 | 0.80 | — | 0.00 | 3.4 | 520 | 15 | 5 | 40 | X |
| 2 | Comp. ex. | 66.30 | 26.00 | 6.50 | 0.20 | 1.00 | — | 0.00 | 7.0 | 530 | 15 | 5 | 45 | X |
| 3 | Ex. | 58.00 | 25.00 | 15.00 | 0.40 | 1.50 | Ni: 0.10 | 0.10 | 3.0 | 530 | 15 | 5 | 42 | X |
| 4 | Comp. ex. | 48.60 | 25.00 | 25.00 | 0.40 | 1.00 | — | 0.00 | 1.7 | 600 | 15 | 5 | 48 | X |
| 5 | Ex. | 54.50 | 29.00 | 15.00 | 0.50 | 1.00 | — | 0.00 | 3.0 | 580 | 15 | 5 | 42 | X |
| 6 | Ex. | 48.35 | 35.00 | 15.00 | 0.60 | 1.00 | Sb: 0.05 | 0.05 | 2.7 | 580 | 15 | 5 | 45 | X |
| 7 | Ex. | 52.55 | 38.00 | 9.00 | 0.40 | 0.05 | — | 0.00 | 5.7 | 550 | 15 | 5 | 44 | X |
| 8 | Ex. | 36.60 | 38.00 | 20.00 | 0.40 | 5.00 | — | 0.00 | 1.0 | 600 | 15 | 5 | 45 | X |
| 9 | Ex. | 45.39 | 42.00 | 12.00 | 0.50 | 0.10 | Ti: 0.01 | 0.01 | 3.7 | 570 | 15 | 5 | 46 | X |
| 10 | Ex. | 43.40 | 42.00 | 12.00 | 0.60 | 1.00 | Cu: 1.00 | 1.00 | 2.9 | 570 | 15 | 5 | 120 | Y |
| 11 | Comp. ex. | 50.35 | 42.00 | 7.00 | 0.60 | 0.05 | — | 0.00 | 7.0 | 570 | 15 | 5 | 120 | X |
| 12 | Comp. ex. | 41.40 | 45.00 | 12.00 | 0.60 | 1.00 | — | 0.00 | 2.8 | 570 | 15 | 15 | 41 | X |
| 13 | Comp. ex. | 41.40 | 45.00 | 12.00 | 0.60 | 1.00 | — | 0.00 | 2.8 | 570 | 5 | 5 | 41 | X |
| 14 | Comp. ex. | 42.00 | 45.00 | 12.00 | 0.00 | 1.00 | — | 0.00 | 2.8 | 570 | 15 | 5 | 41 | X |
| 15 | Ex. | 31.58 | 45.00 | 20.00 | 0.40 | 3.00 | Pb: 0.02 | 0.02 | 1.1 | 600 | 15 | 5 | 44 | X |
| 16 | Ex. | 41.58 | 45.00 | 12.00 | 0.40 | 1.00 | Sn: 0.02 | 0.02 | 2.8 | 570 | 15 | 5 | 22 | X |
| 17 | Ex. | 41.60 | 45.00 | 12.00 | 0.40 | 1.00 | — | 0.00 | 2.8 | 570 | 15 | 5 | 22 | Y |
| 18 | Ex. | 45.80 | 45.00 | 7.00 | 1.10 | 1.00 | Mn: 0.10 | 0.10 | 4.6 | 570 | 15 | 5 | 42 | Y |
| 19 | Comp. ex. | 37.40 | 50.00 | 12.00 | 0.60 | 0.00 | — | 0.00 | 3.1 | 590 | 15 | 5 | 41 | X |
| 20 | Comp. ex. | 31.40 | 50.00 | 12.00 | 0.60 | 6.00 | — | 0.00 | 1.0 | 590 | 15 | 5 | 41 | X |
| 21 | Ex. | 31.59 | 53.00 | 12.00 | 2.00 | 1.40 | Cr: 0.01 | 0.01 | 2.0 | 600 | 15 | 5 | 35 | X |
| 22 | Ex. | 24.40 | 59.00 | 12.00 | 2.00 | 2.10 | Ni: 0.50 | 0.50 | 1.3 | 630 | 15 | 5 | 34 | X |
| 23 | Ex. | 23.70 | 62.00 | 10.00 | 2.00 | 2.30 | — | 0.00 | 1.4 | 650 | 15 | 5 | 31 | X |
| 24 | Ex. | 20.10 | 65.00 | 10.00 | 2.00 | 2.50 | Mn: 0.40 | 0.40 | 1.1 | 650 | 15 | 5 | 35 | X |
| 25 | Ex. | 19.00 | 66.00 | 10.00 | 2.00 | 3.00 | — | 0.00 | 1.0 | 650 | 15 | 5 | 31 | X |
| 26 | Comp. ex. | 12.50 | 66.00 | 15.00 | 5.50 | 1.00 | — | 0.00 | 0.7 | 650 | 15 | 5 | 30 | X |
| 27 | Ex. | 19.00 | 70.00 | 8.00 | 2.00 | 1.00 | — | 0.00 | 1.7 | 680 | 15 | 5 | 35 | X |
| 28 | Ex. | 13.98 | 75.00 | 8.00 | 2.00 | 1.00 | Sr: 0.02 | 0.02 | 1.3 | 680 | 15 | 5 | 36 | X |
| 29 | Ex. | 12.00 | 75.00 | 7.00 | 5.00 | 1.00 | — | 0.00 | 1.2 | 680 | 15 | 5 | 39 | Y |
| 30 | Comp. ex. | 7.00 | 76.00 | 15.00 | 1.00 | 1.00 | — | 0.00 | 0.4 | 690 | 15 | 5 | 30 | X |
| 31 | Comp. ex. | Hot dip galvannealed steel sheet | | | | | | | | | | | | X |
| 32 | Comp- ex. | Hot dip aluminum coated steel sheet | | | | | | | | | | | | X |

The bold underlines indicate outside scope of the present invention or outside the preferable range.

TABLE 2

| | | Acicular Al—Zn—Si—Ca phase (%) | | | | | | α phase (%) | | | | | α/τ eutectic phase (%) | Remaining structure Total (%) |
|---|---|---|---|---|---|---|---|---|---|---|---|---|---|---|
| No. | Class | Area ratio | Al | Zn | Si | Ca | Other | Area ratio | Al | Zn | Mg | Other | Area ratio | Area ratio |
| 1 | Comp. ex. | 0.5 | 40.0 | 37.5 | 8.0 | 12.0 | 2.50 | 14.5 | 45.0 | 55.0 | 0.0 | 0.00 | 85.0 | 0.0 |
| 2 | Comp. ex. | 1.0 | 41.0 | 37.7 | 8.0 | 12.5 | 0.80 | 14.5 | 45.5 | 54.0 | 0.5 | 0.00 | 74.5 | 10.0 |
| 3 | Ex. | 2.1 | 42.1 | 34.3 | 8.0 | 14.1 | 1.50 | 11.9 | 39.9 | 60.0 | 0.0 | 0.10 | 85.0 | 1.0 |
| 4 | Comp. ex. | 2.0 | 46.0 | 32.4 | 8.0 | 10.5 | 3.10 | 5.8 | 50.0 | 50.0 | 0.0 | 0.00 | 82.1 | 10.1 |
| 5 | Ex. | 3.5 | 40.0 | 39.0 | 6.0 | 10.0 | 5.00 | 9.2 | 59.8 | 40.1 | 0.1 | 0.00 | 86.4 | 0.9 |
| 6 | Ex. | 8.1 | 45.0 | 35.4 | 5.0 | 11.5 | 3.10 | 8.4 | 75.4 | 24.0 | 0.6 | 0.02 | 81.1 | 2.4 |

TABLE 2-continued

| No. | Class | | | | | | | | | | | | | |
|---|---|---|---|---|---|---|---|---|---|---|---|---|---|---|
| 7 | Ex. | 8.0 | 42.5 | 37.0 | 5.0 | 11.9 | 3.60 | 6.8 | 73.4 | 26.0 | 0.6 | 0.00 | 82.2 | 3.0 |
| 8 | Ex. | 20.0 | 46.4 | 33.0 | 5.0 | 12.5 | 3.10 | 9.1 | 76.1 | 23.3 | 0.6 | 0.00 | 69.5 | 1.4 |
| 9 | Ex. | 8.4 | 44.1 | 34.3 | 7.0 | 12.5 | 2.10 | 13.1 | 84.5 | 12.5 | 3.0 | 0.01 | 75.5 | 3.0 |
| 10 | Ex. | 8.8 | 44.3 | 30.1 | 8.0 | 13.5 | 4.10 | 14.8 | 87.4 | 10.2 | 2.1 | 0.30 | 74.5 | 1.9 |
| 11 | Comp. ex. | 1.0 | 40.1 | 37.1 | 8.0 | 12.8 | 2.00 | 17.6 | 87.7 | 10.2 | 2.1 | 0.00 | 79.4 | 2.0 |
| 12 | Comp. ex | 1.0 | 39.5 | 38.5 | 7.0 | 14.8 | 0.20 | 21.5 | 89.0 | 10.5 | 0.5 | 0.00 | 76.5 | 1.0 |
| 13 | Comp. ex | 0.7 | 35.4 | 44.6 | 4.0 | 15.1 | 0.90 | 17.7 | 91.4 | 8.1 | 0.5 | 0.00 | 79.5 | 2.1 |
| 14 | Comp. ex. | 0.0 | — | — | — | — | — | 11.4 | 91.4 | 8.1 | 0.5 | 0.00 | 80.5 | 8.1 |
| 15 | Ex. | 3.8 | 48.6 | 24.8 | 7.0 | 18.5 | 1.10 | 16.0 | 89.4 | 8.1 | 2.5 | 0.01 | 78.4 | 1.8 |
| 16 | Ex. | 11.1 | 50.1 | 25.2 | 6.0 | 15.6 | 3.10 | 17.1 | 91.6 | 5.0 | 3.4 | 0.00 | 70.9 | 0.9 |
| 17 | Ex. | 10.5 | 43.4 | 29.3 | 6.1 | 18.4 | 2.80 | 13.4 | 91.6 | 5.0 | 3.4 | 0.00 | 74.0 | 2.1 |
| 18 | Ex. | 6.4 | 42.0 | 35.4 | 6.4 | 14.5 | 1.70 | 19.5 | 96.6 | 1.2 | 2.2 | 0.04 | 71.9 | 2.2 |
| 19 | Comp. ex. | 0.0 | — | — | — | — | — | 26.0 | 97.5 | 1.0 | 1.5 | 0.00 | 67.5 | 6.5 |
| 20 | Comp. ex. | 1.5 | 44.6 | 30.8 | 4.0 | 18.1 | 2.50 | 26.7 | 96.0 | 1.2 | 2.8 | 0.00 | 64.8 | 7.0 |
| 21 | Ex. | 10.0 | 40.9 | 29.5 | 6.0 | 21.0 | 2.60 | 20.2 | 94.7 | 1.2 | 4.1 | 0.01 | 68.1 | 1.7 |
| 22 | Ex. | 9.9 | 41.1 | 30.4 | 7.0 | 20.0 | 1.50 | 21.6 | 95.4 | 0.5 | 4.1 | 0.02 | 67.8 | 0.7 |
| 23 | Ex. | 8.9 | 40.4 | 33.7 | 4.0 | 20.5 | 1.40 | 27.0 | 95.8 | 0.7 | 3.5 | 0.00 | 64.1 | 0.0 |
| 24 | Ex. | 8.8 | 40.7 | 30.4 | 5.0 | 22.1 | 1.80 | 27.7 | 96.1 | 0.1 | 3.7 | 0.10 | 63.4 | 0.1 |
| 25 | Ex. | 9.8 | 40.2 | 29.6 | 6.0 | 21.4 | 2.80 | 39.7 | 96.1 | 0.8 | 3.1 | 0.00 | 50.1 | 0.4 |
| 26 | Comp. ex. | 1.0 | 44.1 | 28.5 | 5.5 | 21.0 | 0.90 | 49.4 | 99.7 | 0.1 | 0.2 | 0.00 | 40.1 | 9.5 |
| 27 | Ex. | 10.1 | 42.5 | 31.3 | 4.1 | 20.0 | 2.10 | 39.1 | 96.3 | 0.6 | 3.1 | 0.00 | 50.5 | 0.3 |
| 28 | Ex. | 11.5 | 41.8 | 28.5 | 5.6 | 22.8 | 1.30 | 47.6 | 97.1 | 0.4 | 2.5 | 0.00 | 40.5 | 0.4 |
| 29 | Ex. | 14.1 | 40.7 | 25.9 | 6.7 | 25.0 | 1.70 | 55.1 | 99.2 | 0.3 | 0.5 | 0.00 | 30.0 | 0.8 |
| 30 | Comp. ex. | 1.5 | 14.0 | 56.9 | 6.0 | 21.0 | 2.10 | 64.0 | 99.8 | 0.0 | 0.2 | 0.00 | 25.4 | 9.1 |
| 31 | Comp. ex | | | | | | | | | | | | — | |
| 32 | Comp. ex. | | | | | | | | | | | | | |

| | | Surface structure Remaining structure | | | Results of evaluation | | | | |
|---|---|---|---|---|---|---|---|---|---|
| | | Clumped τ phase (%) | MgZn$_2$ phase (%) | Other compounds (%) | | | Corrosion resistance | | Hydrogen |
| No. | Class | Area ratio | Area ratio | Area ratio | Cold workability | LME | 150 cycles | 360 cycles | penetration |
| 1 | Comp. ex. | 0.0 | 0.0 | 0.0 | Good | D | D | D | D |
| 2 | Comp. ex. | 0.0 | 10.0 | 0.0 | Poor | D | D | D | D |
| 3 | Ex. | 1.0 | 0.0 | 0.0 | Good | AA | B | C | B |
| 4 | Comp. ex. | 10.1 | 0.0 | 0.0 | Poor | AA | D | D | D |
| 5 | Ex. | 0.9 | 0.0 | 0.0 | Good | AA | B | C | B |
| 6 | Ex. | 2.4 | 0.0 | 0.0 | Good | AAA | A | A | B |
| 7 | Ex. | 1.5 | 1.5 | 0.0 | Good | AAA | A | A | B |
| 8 | Ex. | 1.4 | 0.0 | 0.0 | Good | AA | A | A | B |
| 9 | Ex. | 3.0 | 0.0 | 0.0 | Good | AAA | A | A | B |
| 10 | Ex. | 1.9 | 0.0 | 0.0 | Good | AAA | A | A | A |
| 11 | Comp. ex. | 2.0 | 0.0 | 0.0 | Good | D | D | D | D |
| 12 | Comp. ex | 1.0 | 0.0 | 0.0 | Good | D | D | D | D |
| 13 | Comp. ex | 2.1 | 0.0 | 0.0 | Good | D | D | D | D |
| 14 | Comp. ex. | 3.0 | 0.0 | 5.1 | Poor | D | D | D | D |
| 15 | Ex. | 1.8 | 0.0 | 0.0 | Good | AA | B | C | B |
| 16 | Ex. | 0.9 | 0.0 | 0.0 | Good | AAA | A | A | B |
| 17 | Ex. | 2.1 | 0.0 | 0.0 | Good | AAA | A | A | AA |
| 18 | Ex. | 2.2 | 0.0 | 0.0 | Good | AA | B | C | AA |
| 19 | Comp. ex. | 1.1 | 0.0 | 5.4 | Poor | D | D | D | C |
| 20 | Comp. ex. | 1.7 | 0.0 | 5.3 | Poor | D | D | D | C |
| 21 | Ex. | 1.7 | 0.0 | 0.0 | Good | AA | A | A | B |
| 22 | Ex. | 0.7 | 0.0 | 0.0 | Good | AA | A | A | B |
| 23 | Ex. | 0.0 | 0.0 | 0.0 | Good | AA | A | A | B |
| 24 | Ex. | 0.1 | 0.0 | 0.0 | Good | AA | A | A | B |
| 25 | Ex. | 0.4 | 0.0 | 0.0 | Good | AA | A | A | B |
| 26 | Comp. ex. | 0.4 | 0.0 | 9.1 | Poor | D | D | D | C |
| 27 | Ex. | 0.3 | 0.0 | 0.0 | Good | AA | A | A | B |
| 28 | Ex. | 0.4 | 0.0 | 0.0 | Good | AA | A | A | B |
| 29 | Ex. | 0.8 | 0.0 | 0.0 | Good | AA | A | A | AA |
| 30 | Comp. ex. | 0.6 | 0.0 | 8.5 | Poor | D | D | D | D |
| 31 | Comp. ex | — | | | Good | D | D | D | AA |
| 32 | Comp. ex. | | | | Good | AA | D | D | D |

Bold underlines indicate outside scope of present invention.

The surface structures of the plating layers in the plated steel materials obtained in the examples and comparative examples and the various characteristics when hot stamping those plated steel materials were investigated by the following methods: The results are shown in Table 2. In Tables 1 and 2, Comparative Examples 31 and 32 respectively relate to hot dip galvannealed (Zn-11% Fe) steel sheet and hot dip aluminum coated (Al-10% Si) steel sheet conventionally used as plated steel materials and show the results when hot stamping these steel sheets. The chemical compositions and surface structures of the plating layers of Comparative Examples 31 and 32 clearly differ from the chemical compositions and surface structures of the plating layers according to the present invention, therefore analysis of the chemical compositions and surface structures of these plating layers were omitted. Further, Comparative Examples 31 and 32 are just commercially available products which were evaluated. Therefore, details of the production methods of these steel sheets are not known.

[Area Ratio and Composition of Each Phase in Surface Structure of Plating Layer]

The area ratio of each phase in the surface structure of the plating layer was determined as follows: First, a prepared sample was cut into 25 mm×15 mm size. The plating layer surface was photographed by a 1500× power by an SEM. From the BSE image, the area ratio of each phase was measured by computer image processing. The averages of these measured values at any five fields were determined as the area ratios of the acicular Al—Zn—Si—Ca phase, α phase, α/τ eutectic phase, and other phases and compounds. In particular, the area ratio of the clumped τ phase was determined by measuring the area ratio of a region surrounded by boundary lines defined by the α phase present around the clumped τ phase using computer image processing. Further, the acicular Al—Zn—Si—Ca phase and α phase could be easily discriminated from the SEM-BSE image. For caution's sake, any 10 structures were respectively selected from the structures discriminated as the acicular Al—Zn—Si—Ca phase and α phase and the structures were analyzed for chemical compositions by SEM-EDS. As a result, the chemical compositions of the 10 structures of the acicular Al—Zn—Si—Ca phase were in each case an Al content of 36.0 to 50.0%, a Zn content of 20.0 to 80.0%, an Si content of 1.0 to 10.0%, a Ca content of 5.0 to 25.0%, and a total of the contents of the other elements as the balance of 5.0% or less. Similarly, the chemical compositions of the 10 structures of the α phase were in each case an Al content of 20.0 to 89.9%, a Zn content of 0.1 to 70.0%, an Mg content of 0 to 5.0%, a total of the Al content and Zn content of 90.0% or more, and a total of the contents of the other elements as the balance of 1.00% or less. By way of reference, the average values of the results of analysis of the compositions of the respective 10 structures were calculated and described in Table 2.

[Cold Workability]

The cold workability was evaluated by shearing a sample of the plated steel material by a clearance of 10%, then peeling off a tape from a range of within 5 mm from the cut end face. A case where there was no peeling of the plating layer was deemed as passing (good), while a case where there was peeling was deemed as failing (poor).

[LME Resistance]

The LME resistance was evaluated by subjecting a sample of the plated steel material to a hot V-bending test. Specifically, a sample 170 mm×30 mm of the plated steel material was heated in a heating furnace and taken out from the furnace when the temperature of the sample reached 900° C. A precision press was used to conduct a V-bending test. The V-bending die had a shape of a V-bending angle of 90° and R=1, 2, 3, 4, 5, and 10 mm. The LME resistance was ranked as follows: Rankings of AAA, AA, A, and B were deemed passing.

AAA: No LME cracking occurred even with R of 1 mm.
AA: LME cracking occurred with R of 1 mm, but LME cracking did not occur with R of 2 mm
A: LME cracking occurred with R of 2 mm, but LME cracking did not occur with R of 3 mm
B: LME cracking occurred with R of 3 mm, but LME cracking did not occur with R of 4 mm
C: LME cracking occurred with R of 4 mm, but LME cracking did not occur with R of 5 mm
D: LME cracking occurred with R of 5 mm, but LME cracking did not occur with R of 10 mm

[Corrosion Resistance]

The corrosion resistance of the plated steel material was evaluated as follows. First, a sample 50 mm×100 mm of the plated steel material after hot stamping was treated by zinc phosphate (SD5350 System: standard made by Nippon Paint Industrial Coatings Co., Ltd.), then was coated by electrodeposition (PN110 Powernix Gray: standard made by Nippon Paint Industrial Coatings Co., Ltd.) by a thickness of 20 μm and was baked at 150° C. for 20 minutes. Next, cross cuts (40×√2 mm, 2) were made reaching the base iron. The coated plated steel material was used for a combined cyclic corrosion test in accordance with JASO (M609-91). The maximum blister widths at eight locations around the cross cuts after the elapse of 150 cycles and after the elapse of 360 cycles for evaluating the long-term corrosion resistance were respectively measured. The average values of the obtained measured values were found and ranked as follows: In the tests after the elapse of 150 cycles, samples evaluated as A and B were deemed passing.

A: Width of coating blister from cross-cut of 1 mm or less
B: Width of coating blister from cross-cut of 1 to 2 mm
C: Width of coating blister from cross-cut of 2 to 4 mm
D: Red rusting

[Hydrogen Penetration Resistance]

The hydrogen penetration resistance of the plated steel material was found as follows: First, a sample of the plated steel material after hot stamping was stored in liquid nitrogen. Thermal desorption spectroscopy was used to find the concentration of hydrogen penetrating the plated steel material. Specifically, the sample was heated in a heating furnace equipped with a gas chromatograph and the amount of hydrogen released from the sample up to 250° C. was measured. The measured amount of hydrogen was divided by the mass of the sample to find the amount of hydrogen penetration. This was ranked as follows: Rankings of AAA, AA, A, and B were deemed passing.

AAA: Amount of hydrogen penetration of 0.1 ppm or less
AA: Amount of hydrogen penetration of more than 0.1 to 0.2 ppm
A: Amount of hydrogen penetration of more than 0.2 to 0.3 ppm
B: Amount of hydrogen penetration of more than 0.3 to 0.5 ppm
C: Amount of hydrogen penetration of more than 0.5 to 0.7 ppm
D: Amount of hydrogen penetration of 0.7 ppm or more Referring to Tables 1 and 2, in Comparative Example 1, the Al content in the plating layer was small, therefore the acicular Al—Zn—Si—Ca phase was not sufficiently formed in the surface structure of the plating layer. It is believed that a barrier layer comprised of a Ca-based oxide film was not formed at the time of heating in the hot stamping. As a result, at the time of the above heating, Zn and Mg in the plating layer evaporated, therefore the LME resistance, hydrogen penetration resistance, and corrosion resistance were evaluated as being poor. In Comparative Example 2, the Mg content in the plating layer was small and, further, the value of Zn/(Mg+3×Ca) was more than 6.5, therefore the equilibrium balance was lost, the acicular Al—Zn—Si—Ca phase was not sufficiently formed in the surface structure of the plating layer, and as a result the LME resistance, hydrogen penetration resistance, and corrosion resistance were evaluated as poor. In addition, the $MgZn_2$ phase was formed in a large amount and the cold workability was also evaluated as poor. In Comparative Example 4, the Mg content in the plating layer was large and an excessive sacrificial corrosion action caused the corrosion resistance to fall. Further, since the Mg content was large, hydrogen penetration occurred due to the evaporation of Mg at the time of hot stamping. Further, the clumped τ phase having Mg, Zn, and Al as main constituents was formed in relatively large amounts, therefore the cold workability was also evaluated as poor. In Comparative Example 11, the value of Zn/(Mg+3×Ca) at the plating layer was more than 6.5, therefore the equilibrium balance was lost, the acicular Al—Zn—Si—Ca phase was not sufficiently formed in the surface structure of the plating layer, and as a result the LME resistance, hydrogen penetration resistance, and corrosion resistance were evaluated as poor. In Comparative Examples 12 and 13, the cooling of the plating layer did not satisfy the predetermined conditions of two-stage cooling, therefore the acicular Al—Zn—Si—Ca phase was not sufficiently formed in the surface structure of the plating layer and as a result the LME resistance, hydrogen penetration resistance, and corrosion resistance were evaluated as poor. In Comparative Example 14, Si was not contained in the plating layer, therefore the acicular Al—Zn—Si—Ca phase was not formed in the surface structure of the plating layer, and as a result the LME resistance, hydrogen penetration resistance, and corrosion resistance were evaluated as poor. In addition, in Comparative Example 14, since Si was not contained in the plating layer, $Al_4Ca$ was formed in 5.0% or more and the cold workability was also evaluated as poor. In Comparative Example 19, Ca was not contained in the plating layer, therefore the acicular Al—Zn—Si—Ca phase was not formed in the surface structure of the plating layer and as a result the LME resistance, hydrogen penetration resistance, and corrosion resistance were evaluated as poor. In addition, in Comparative Example 19, since Ca was not contained in the plating layer, $Mg_2Si$ was formed in 5.0% or more and the cold workability was evaluated as poor. In Comparative Examples 20 and 30, the Ca content or Al content in the plating layer was too high, therefore in the plating layer, $Al_4Ca$ was preferentially formed, the acicular Al—Zn—Si—Ca phase was not sufficiently formed, and as a result the LME resistance, hydrogen penetration resistance, and corrosion resistance were evaluated as poor. Furthermore, since $Al_4Ca$ was formed in 5.0% or more, the cold workability was also evaluated as poor. In Comparative Example 26, the Si content in the plating layer was too high, therefore in the plating layer, $Mg_2Si$ phase was preferentially formed, the acicular Al—Zn—Si—Ca phase was not sufficiently formed, and as a result the LME resistance, hydrogen penetration resistance, and corrosion resistance were evaluated as poor. Furthermore, since $Mg_2Si$ phase was formed in 5.0% or more, the cold workability was also evaluated as poor. In Comparative Example 31 using conventional hot dip galvannealed steel sheet, the hydrogen penetration resistance was excellent, but the LME resistance and corrosion resistance were evaluated as poor. In Comparative Example 32 using conventional hot dip aluminum coated steel sheet, the LME resistance was excellent, but the hydrogen penetration resistance and corrosion resistance were evaluated as poor.

In contrast to this, in all of the examples according to the present invention, by suitably controlling the chemical composition of the plating layer and the area ratio of the acicular Al—Zn—Si—Ca phase contained in the surface structure of the plating layer, a plated steel material in which the LME resistance and hydrogen penetration resistance were improved and, furthermore, the corrosion resistance after hot stamping was excellent could be obtained. In particular, if referring to Tables 1 and 2, it will be understood that by controlling the Al content in the plating layer to 35.00 to 50.00%, the LME resistance is remarkably improved and, similarly, by controlling the Mg content in the plating layer to 9.00 to 15.00%, the corrosion resistance is remarkably improved. Further, in Examples 3, 5, 15, and 18 where the area ratios of the acicular Al—Zn—Si—Ca phase are 2.0% or more and less than 8.0%, the corrosion resistances after the elapse of 150 cycles in combined cyclic corrosion tests were ranked as B. Furthermore, the corrosion resistances after the elapse of 360 cycles fell somewhat compared with the rankings of corrosion resistances after the elapse of 150 cycles, while in Examples 6 to 10, 16, 17, 21 to 25, and 27 to 29 where the area ratios of the acicular Al—Zn—Si—Ca phase are 8.0% or more, the corrosion resistances after the elapse of 150 cycles were ranked A. Furthermore, the corrosion resistances after the elapse of 360 cycles were the same as the ranking of corrosion resistance after the elapse of 150 cycles. Therefore, high corrosion resistances and long-term corrosion resistances were exhibited.

Example B

In this example, the inventors studied the conditions of two-stage cooling of a plating layer. First, except for using plating baths having the chemical compositions shown in Table 3 and further forming plating layers under the conditions shown in Table 3, they followed the same procedure as in the case of Example A to obtain plated steel materials with plating layers formed on the two surfaces of the steel base materials. The surface structures of the plating layers at the obtained plated steel materials and various characteristics when hot stamping the plated steel materials were examined by methods similar to the case of Example A. The results are shown in Table 4.

TABLE 3

| | | Production method | | | | | | | | | |
|---|---|---|---|---|---|---|---|---|---|---|---|
| | | Chemical composition of plating layer (mass %) | | | | | | Bath | Bath temp. to 450° C. average | 450 to 350° C. average | Amount of deposition of plating layer | HS |
| | | | | | | | Others | | temp. | cooling speed | cooling speed | per surface | heat |
| No. | Class | Zn | Al | Mg | Si | Ca | Type | Total | (° C.) | (° C./sec) | (° C./sec) | (g/m²) | treatment |
| 41 | Comp. ex. | 56.50 | 30.00 | 12.00 | 0.50 | 1.00 | — | 0.00 | 580 | __10__ | 5 | 48 | X |
| 42 | Comp. ex. | 41.40 | 45.00 | 12.00 | 0.60 | 1.00 | — | 0.00 | 600 | 15 | __7__ | 45 | X |
| 43 | Comp. ex. | 26.50 | 60.00 | 12.00 | 0.50 | 1.00 | — | 0.00 | 680 | 15 | __7__ | 46 | X |

The bold underlines indicate outside scope of the present invention or outside the preferable range.

TABLE 4

| | | Surface structure | | | | | | | | | | | |
|---|---|---|---|---|---|---|---|---|---|---|---|---|---|
| | | Acicular Al—Zn—Si—Ca phase (%) | | | | | α phase (%) | | | | | α/τ eutectic phase (%) | Remaining structure Total (%) |
| No. | Class | Area ratio | Al | Zn | Si | Ca | Others | Area ratio | Al | Zn | Mg | Others | Area ratio | Area ratio |
| 41 | Comp. ex. | 1.2 | 39.3 | 38.0 | 6.5 | 11.0 | 5.20 | 18.5 | 59.6 | 40.3 | 0.1 | 0.00 | 79.2 | 1.1 |
| 42 | Comp. ex. | 1.6 | 40.9 | 38.5 | 6.4 | 10.0 | 4.20 | 23.3 | 89.8 | 8.0 | 2.2 | 0.04 | 74.1 | 1.0 |
| 43 | Comp. ex. | 1.5 | 40.4 | 37.1 | 6.0 | 11.5 | 5.00 | 27.0 | 95.6 | 1.5 | 2.9 | 0.00 | 70.3 | 1.0 |

| | | Surface structure Remaining structure | | | Results of evaluation | | | | |
|---|---|---|---|---|---|---|---|---|---|
| | | Clumped τ phase (%) | MgZn$_2$ phase (%) | Other compounds (%) | Cold work-ability | LME | Corrosion resistance | | Hydrogen penetration |
| No. | Class | Area ratio | Area ratio | Area ratio | | | 150 cycles | 360 cycles | |
| 41 | Comp. ex. | 1.1 | 0.0 | 0.0 | Good | D | D | D | D |
| 42 | Comp. ex. | 1.0 | 0.0 | 0.0 | Good | D | D | D | D |
| 43 | Comp. ex. | 1.0 | 0.0 | 0.0 | Good | D | D | D | D |

The bold underlines indicate outside scope of the present invention or outside the preferable range.

Referring to Tables 3 and 4, in Comparative Example 41 where the first stage average cooling speed of the plating layer was 10° C./sec, since that average cooling speed was somewhat low, the acicular Al—Zn—Si—Ca phase was not sufficiently formed in the surface structure of the plating layer and as a result the LME resistance, hydrogen penetration resistance, and corrosion resistance were evaluated as being poor. Further, in Comparative Examples 42 and 43 where the second stage average cooling speed of the plating layer was 7° C./sec, since the average cooling speed was somewhat high, similarly the acicular Al—Zn—Si—Ca phase was not sufficiently formed in the surface structure of the plating layer and as a result the LME resistance, hydrogen penetration resistance, and corrosion resistance was evaluated as being poor. From the results of Tables 1 to 4, it is learned that in order to make the acicular Al—Zn—Si—Ca phase form more reliably at a 2.0% or more area ratio, it is preferable to first cool by a 14° C./sec or more or 15° C./sec or more average cooling speed from the bath temperature to 450° C., then cool by a 5.5° C./sec or less or 5° C./sec or less average cooling speed from 450° C. to 350° C.

Example C

In this example, the inventors studied the point of change of the cooling speed between rapid cooling and slow cooling in two-stage cooling of a plating layer. Except for using a plating bath having a chemical composition by mass % of Zn: 41.40%, Al: 45.00%, Mg: 12.00%, Si: 0.60%, and Ca: 1.00% (bath temperature 600° C.) and further changing the point of change of the cooling speed to 375° C., 400° C., 425° C., 450° C., 475° C., and 500° C. and making the average cooling speed of the first stage 15° C./sec and the average cooling speed of the second stage 5° C./sec, they followed the same procedure as in the case of Example A to obtain plated steel materials with plating layers formed on both surfaces of the steel base materials. They examined the area ratios of the acicular Al—Zn—Si—Ca phases at the surface structures of the plating layers at the obtained plated steel materials. The results are shown in FIG. 4.

Figure 4:
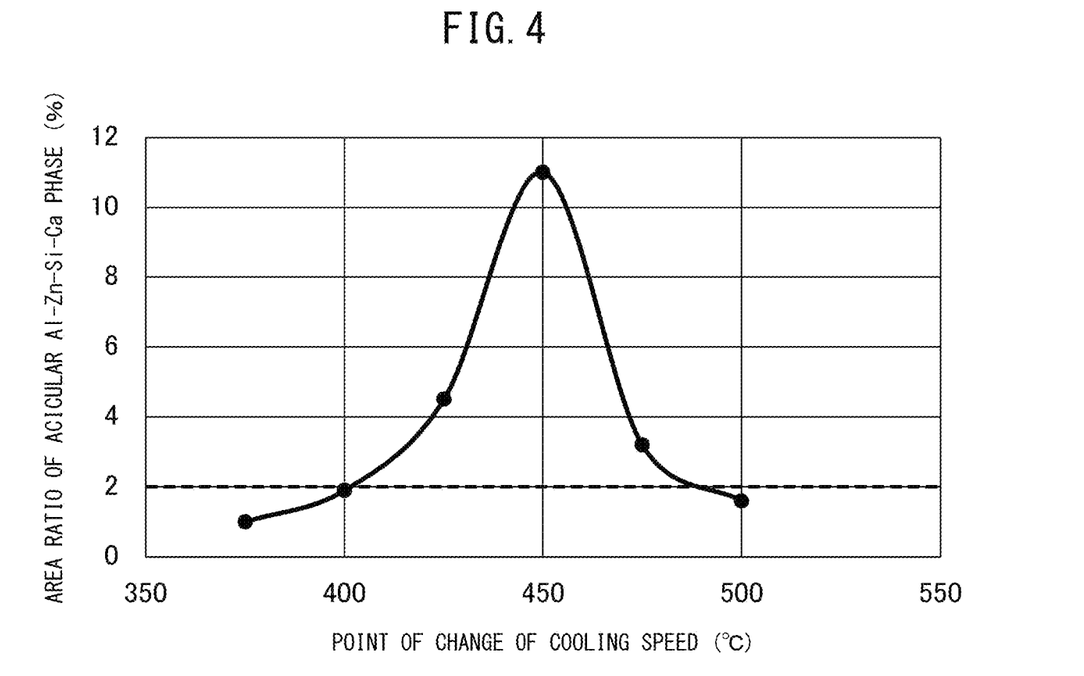
FIG. 4 is a graph showing a relationship between a point of change of a cooling speed when cooling a plating layer and formation of an acicular Al—Zn—Si—Ca phase.

Referring to FIG. 4, if the point of change of the cooling speed is 400° C., the area ratio of the acicular Al—Zn—Si—Ca phase is 1.9%, and therefore 2.0% or more could not be secured, while if the point of change of the cooling speed is 425° C., 450° C., and 475° C., 2.0% or more of the acicular Al—Zn—Si—Ca phase could be formed. In particular, if the point of change of the cooling speed is 450° C., the highest area ratio of the acicular Al—Zn—Si—Ca phase could be achieved.

REFERENCE SIGNS LIST

1 α phase
2 α/τ eutectic phase
3 clumped τ phase
4 acicular Al—Zn—Si—Ca phase
5 MgZn$_2$ phase

The invention claimed is:
1. A plated steel material comprising a steel base material and a plating layer on a surface of the steel base material, wherein the plating layer has a chemical composition comprising, by mass %,
Al: 25.00 to 75.00%,
Mg: 7.00 to 20.00%,
Si: 0.10 to 5.00%,
Ca: 0.05 to 5.00%,
Sb: 0 to 0.50%,
Pb: 0 to 0.50%,
Cu: 0 to 1.00%,

Sn: 0 to 1.00%,
Ti: 0 to 1.00%,
Sr: 0 to 0.50%,
Cr: 0 to 1.00%,
Ni: 0 to 1.00%,
Mn: 0 to 1.00%, and
balance: Zn and impurities, and
in a surface structure of the plating layer, there is, by area ratio, 2.0% or more of an acicular Al—Zn—Si—Ca phase.

2. The plated steel material according to claim 1, wherein the surface structure of the plating layer consists of, by area ratio,
an acicular Al—Zn—Si—Ca phase: 2.0 to 20.0%,
an α phase: 5.0 to 80.0%,
an α/τ eutectic phase: 20.0 to 90.0%, and
other remaining structure: less than 10.0%.

3. The plated steel material according to claim 2, wherein the chemical composition of the plating layer comprises, by mass %,
Al: 35.00 to 50.00% and
Mg: 9.00 to 15.00%.

4. The plated steel material according to claim 3, wherein the area ratio of the acicular Al—Zn—Si—Ca phase in the surface structure is 8.0% or more.

5. The plated steel material according to claim 2, wherein the area ratio of the acicular Al—Zn—Si—Ca phase in the surface structure is 8.0% or more.

6. The plated steel material according to claim 1, wherein the chemical composition of the plating layer comprises, by mass %,
Al: 35.00 to 50.00% and
Mg: 9.00 to 15.00%.

7. The plated steel material according to claim 6, wherein the area ratio of the acicular Al—Zn—Si—Ca phase in the surface structure is 8.0% or more.

8. The plated steel material according to claim 1, wherein the area ratio of the acicular Al—Zn—Si—Ca phase in the surface structure is 8.0% or more.

* * * * *